(12) United States Patent
Taormina et al.

(10) Patent No.: US 6,336,612 B1
(45) Date of Patent: Jan. 8, 2002

(54) SATELLITE SYSTEM AND METHOD OF DEPLOYING SAME

(75) Inventors: Frank Taormina, El Segundo; Donald C.D. Chang, Thousand Oaks; Kar W. Yung, Torrance; David C. Cheng, Palos Verdes Estates; William W. Mayfield, Torrance; John Novak, III, West Hills; Arthur W. Wang, Cypress, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/783,862

(22) Filed: Feb. 13, 2001

Related U.S. Application Data

(62) Division of application No. 09/188,440, filed on Nov. 9, 1998.

(51) Int. Cl.[7] .................................................. B64G 1/00
(52) U.S. Cl. .................................................. 244/158 R
(58) Field of Search ...................... 244/158 R; 455/13.3, 455/13.1; 701/213, 226; 342/357.01, 357.06

(56) References Cited

U.S. PATENT DOCUMENTS

| | | | | |
|---|---|---|---|---|
| 4,126,865 A | * | 11/1978 | Longhurst et al. | 343/766 |
| 4,819,002 A | * | 4/1989 | Reboullet | 343/765 |
| 4,875,052 A | * | 10/1989 | Anderson et al. | 343/882 |
| 5,075,642 A | * | 12/1991 | Dehnert | 342/352 |
| 5,077,561 A | * | 12/1991 | Gorton et al. | 342/359 |
| 5,439,190 A | | 8/1995 | Horstein et al. | 244/158 |
| 5,473,601 A | | 12/1995 | Rosen et al. | 370/50 |
| 5,551,624 A | | 9/1996 | Horstein et al. | 244/158 |
| 5,655,005 A | | 8/1997 | Wiedeman et al. | 370/320 |
| 5,678,175 A | | 10/1997 | Stuart et al. | 455/13.1 |
| 5,765,098 A | | 6/1998 | Bella | 455/13.3 |
| 5,793,813 A | | 8/1998 | Cleave | 375/259 |
| 5,884,866 A | | 3/1999 | Steinmeyer et al. | 244/137.1 |
| 5,918,157 A | | 6/1999 | Wiedeman et al. | 455/13.1 |
| 6,073,011 A | | 6/2000 | Horstein | 455/427 |
| 6,122,596 A | | 9/2000 | Castiel | 701/226 |

FOREIGN PATENT DOCUMENTS

| | | | | |
|---|---|---|---|---|
| WO | 97106269.0 | 12/1994 | | B64G/1/10 |

OTHER PUBLICATIONS

Anonymous, "Orbital Plans High–Capactiy "Space Cable" Global Satellite Network," Press Release Online!, Sep. 25, 1997, XP002132567.

Thiel A. K., "Medium Altitude Phased Orbit Satellite Systems", Conference Proceedings Winter Convention on Military Electronics, Jan. 1, 1965, p. 17–24, p. 21, right–hand column; p. 22 left–hand column.

Logsdon, "Mobile Communication Satellites", 1995, McGraw–Hill Inc., New York, XP002132568, p. 156 –p. 157, p. 208 –p. 209, p. 223.

* cited by examiner

*Primary Examiner*—Peter M. Poon
*Assistant Examiner*—Kevin Jakel
(74) *Attorney, Agent, or Firm*—Vijayalakshi D. Duraiswamy; Michael W. Sales

(57) ABSTRACT

A satellite communication system has a first deployment of a plurality of satellites deployed in a medium earth orbit and two later deployments of a plurality of satellites deployed in the medium earth orbit. The first deployment is spaced so that the second deployment may be easily deployed and interleaved into the first deployment. A ground terminal is used for communicating with the satellites in the first and second deployments.

6 Claims, 8 Drawing Sheets

SATELLITE SYSTEM AND METHOD OF DEPLOYING SAME

This is a division of application Ser. No. 09/188,440 filed Nov. 9, 1998.

TECHNICAL FIELD

The present invention relates to space and communications satellites, and more particularly, to a coordinated system for providing satellite communications using multiple satellites.

BACKGROUND OF THE INVENTION

Wired terrestrial systems offer communications at high data rates, but only while the user is sitting behind a computer. As soon as the user goes to a conference room, walks outside an office building, gets into a car, or drives to a park, the connection is lost. Mobility, however, can be supported in one of two ways, namely terrestrial-based wireless networks or satellite-based communications systems.

Terrestrial-based wireless networks provide voice or data communications between a mobile user and a fixed user or to other mobile users, as well as communications for modem-equipped computers and other similar devices such as mobile facsimile machines. Existing wireless networks have not been optimized for a mix of voice, data, and video, however, despite the trend towards multimedia traffic. Several wireless and wired standards, such as asynchronous transfer mode (ATM), are being designed to optimize multimedia traffic. Wireless wide area networks (WANs) typically carry voice, whereas wireless local area networks (LANs) typically carry data. Most wireless WAN traffic operates at under 19.2 kbps. Wireless LANs that support data rates up to 10 Mbps have begun to appear, but they are limited in range to tens of meters.

To provide wireless service, satellite-based communications systems have been proposed which would provide world-wide coverage. These proposed systems typically include a constellation of satellites in one orbit only, such as geostationary earth orbit (GEO) only or non-geostationary orbits (NGSO). Communications satellites in geostationary orbit provide coverage in predetermined areas on the earth from the equator. Coverage is typically excluded from the oceans so that satellite capacity is not wasted on non-populated areas. Communications satellites in geostationary orbit, however, provide limited coverage at higher or lower latitudes than the Equator.

Communications satellites in non-geostationary orbit, such as medium earth orbit (MEO) or low earth orbit (LEO), travel relative to the Earth's rotation and typically provide high elevation angle coverage at the higher and lower latitudes, and since they are closer to earth, propagation time delays are minimized. Because of the unavailability of stationary positions it is desirable to deploy NGSO satellites.

In one known implementation of a NGSO satellite system, several disadvantages are apparent. In the known system, each satellite is deployed in its position individually. One drawback to individual launches is the high cost associated with each launch. Another drawback is that the system is not easily adaptable to increasing demand. Individual launches must be used to provide increased coverage.

Data rates up to 19.2 kbps, as available from wireless WANs, will not meet future data rate needs of consumers. For example, many computer users are upgrading their wired modems to 56.6 kbps whenever possible. Such users desire a fast response from their modems even while they are away from their desks. In addition, the nature of the information being transferred is changing from short, text-based electronic mail messages to communications with embedded video clips. Such media-rich messages consume high bandwidth and communications resources, thus requiring high data rates to allow them to be transmitted and received within a reasonable period of time.

Furthermore, a tremendous growth in Internet traffic has caused a strain on the capacity of telephony networks. Network shortcomings include network outages, insufficient access bandwidth, and insufficient internode bandwidth. Currently, providers need to make significant investments, as well as experience installation delays, to upgrade network infrastructure, yet they cannot pass the costs on to the end users.

Corporate LANs/WANs also generate an insatiable demand for higher bandwidth. The demand for bandwidth goes up as more and more users are connected. The users, in turn, demand more services and improved network speed. Personal computers are being used to process not only text, but graphics and video as well, all on networks that are increasingly global. Widespread implementation of corporate intranets and extranets further drive the move to increased bandwidth applications. High-speed networking is also driven by the growth of video distribution, client/server technology, decentralized systems, increased processing power and developments in storage capacity.

Fixed service demand such as satellite news broadcast, distance learning, and military functions are continually increasing. It would be desirable to provide a system capable of meeting demand of such uses.

Thus, there exists a need for a satellite communications system that provides communications to mobile users as well as fixed service users. There also exists a need for a satellite communications system that provides global communications service while maximizing the useful capacity of the satellites, reducing the perceived time delay, and maximizing the minimum elevation angle across latitudes.

DISCLOSURE OF THE INVENTION

The present invention provides a satellite communications system which provides global network services to fixed and mobile users. The system utilizes a first deployment of a plurality of satellites deployed in a medium earth orbit (MEO) and a few subsequent deployments of a plurality of satellites deployed in the same medium earth orbit (MEO) or other orbits. A ground terminal is provided for communicating with the first and the later deployments.

In one aspect of the invention, the satellites may be deployed in at 15000 km. One advantage of using 15000 km is that the satellites avoid interference with the Van Allen radiation belts. Another advantage is that polar orbiting satellites need not be deployed.

One advantage of the invention is that a one dimensional tracking ground antenna may be employed. A one dimensional tracking antenna is less expensive than two-dimensional antennas.

Another advantage of the invention is that the system is extremely adaptable in a business sense. That is, the system can be deployed in a first configuration. Then, as the needs of the users of the system increase, further satellites may be deployed. The first deployment may be spaced to easily accommodate the second deployment so that the second deployment may be accomplished in a single launch.

Another advantage of the invention is that the constellation of the present invention promotes frequency reuse. That is, because the MEO satellites of the present invention are not in a direct line with GSO satellites, the frequencies of GSO satellites may be reused in the present constellation.

Yet another advantage of the present invention is that some time will lapse between the initial deployment and later deployments. Thus, the later deployments may take advantage of the newest technology, which is important in the rapidly changing satellite technology industry.

DESCRIPTION OF THE PREFERRED EMBODIMENT(S)

Figure 1:
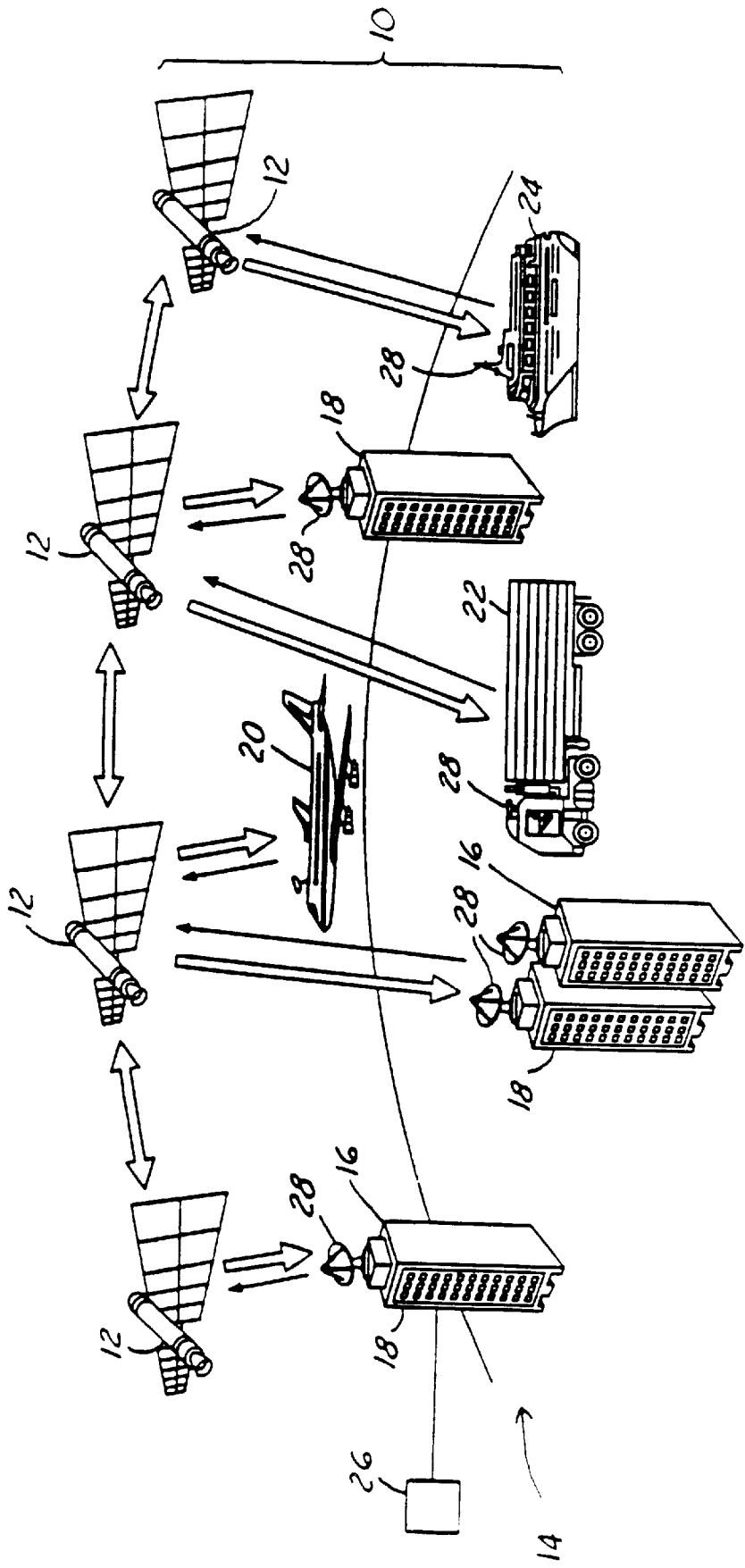
FIG. 1 is a diagrammatic representation illustrating a satellite communications system of the present invention.

Referring to FIG. 1, the communication system 10 with a typical geometry for practicing the invention is diagrammatically illustrated. In general, system 10 includes a plurality of communication satellites 12 in middle earth orbit (MEO). As will be further described below, system 10 may also include satellites in an inclined medium earth orbit. The MEO satellites 12 provide quick introduction of regional services and low cost service over selected regions. The system 10 has a user segment 14 and a ground segment 16. User segment 14 generally comprises a number of fixed terrestrial sites 18 as well as a number of mobile sites. Mobile sites may include vehicles such as an airplane 20, a tractor-trailer 22, and a ship 24. Various applications within the vehicles may incorporate satellite-based communication including navigation and communication applications.

Fixed sites 18 may be used as satellite operational centers for tracking and communication control, as network operational centers for various communications such as Internet connections, or beacon stations for satellite position control. Fixed sites 18 may, for example, be coupled to a terrestrial communications link 26. Terrestrial communications link 26 may, for example, be a connection into existing phone lines or cable/television lines.

User segment 14 and ground segment 16 each have an antenna 28. For ground segment 16, a fixed one-dimensional antenna 28 is preferred. One-dimensional tracking may be used due to the repeating path of the medium earth orbit satellites. For mobile communications, a two dimensional tracking antenna 28 is required. Antennas 28 are preferably electronically directed toward satellite 12 during movement. The system may communicate using V band or other suitable frequencies.

Various applications of a communication system formed according to the present invention include video conferencing, distance learning, corporate training, worldwide web games, internet-based interactive services, corporate communications, collaboration between suppliers and vendors, telemedicine and telehealth applications and satellite news gathering. Particular industries that may benefit from such a satellite communication system would be industries that have international exposure and provide international services such as the airline, shipping, cruise, and businesses with some international exposure. For example, parcel delivery services, airlines, and cruise lines will be able to track assets on a global basis.

Figure 2:
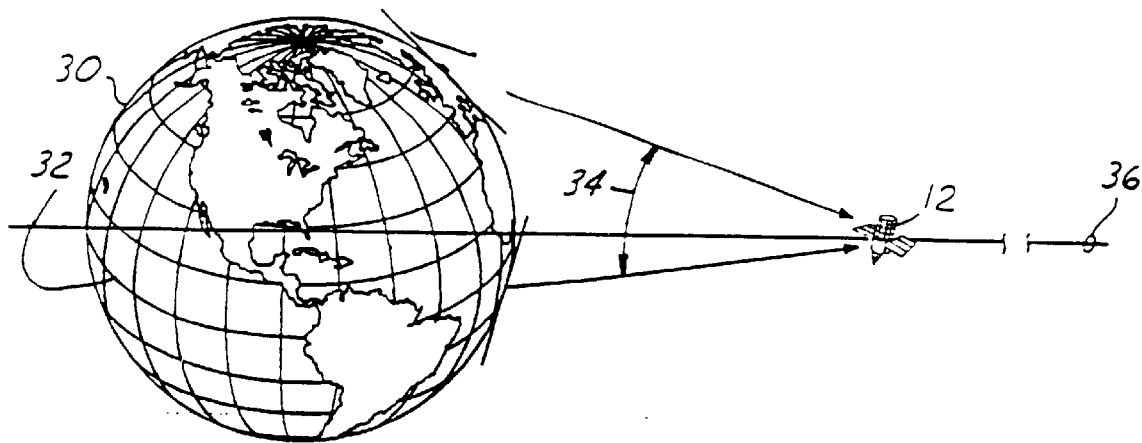
FIG. 2 is a schematic illustration of a satellite of FIG. 1 viewed from the edge of the equatorial plane.

Referring now to FIG. 2, earth 30 has an equatorial plane 32 that divides the upper hemisphere and lower hemisphere. As shown in FIG. 2, an edge view of equatorial plane 32 is shown. One satellite 12 is shown, however, the constellation preferably comprises at least four satellites in an initial operation configuration (IOC). The elevation angle 34 is shown from a point on the earth to satellite 12 with respect to equatorial plane 32. With four satellites in the IOC, semi-global coverage may be achieved. This means that most of the highly populated areas of the globe may have service from the system. As will be further discussed below, by increasing the number of satellites in the system, ubiquitous coverage of the globe may be achieved.

Satellites 12 are preferably deployed in medium earth orbit at a distance of at least 10000 km from the Earth's surface. Satellites 12 may be deployed between about 10000 km and 17000 km. In a preferred embodiment, satellites 12 are deployed at about 15000 km. By deploying the satellites at 15000 km, elevation angles are increased in the most populated latitudes of the earth.

For perspective purposes, a geostationary satellite 36 is illustrated. Geostationary satellites 36 are deployed at about 35000 km. This is over twice the distance of communication satellite 12 in medium earth orbit. The path of satellites 12 is in the line-of-sight of GSO satellites 36, except for at a narrow region around equator 32. One advantage of the system is that frequency reuse may be accomplished between the satellites 12 of the present invention and GSO satellites 36.

Figure 3A:
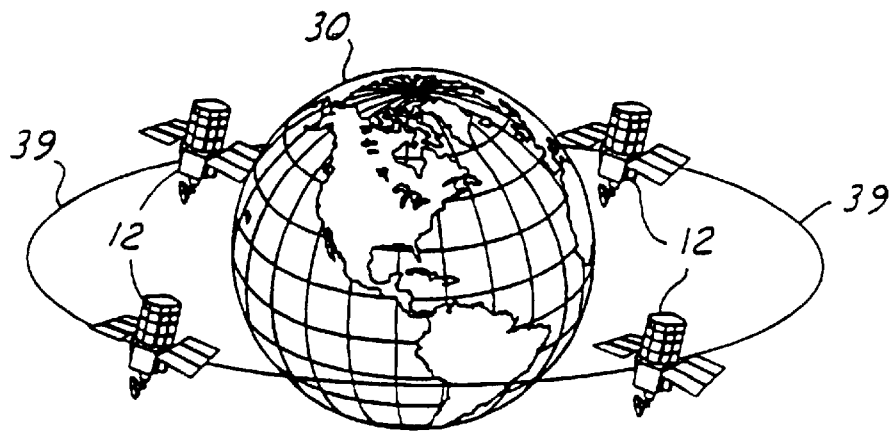
FIG. 3A is a schematic illustration of an initial operation configuration constellation of communications satellites utilized in the present invention.

Referring now to FIGS. 3A, communication satellites 12 are illustrated in a single plane in an initial operation configuration (IOC). Preferably, the satellites 12 are deployed in the equatorial plane. To provide semi-global coverage, four satellites are preferably deployed. Because each satellite is equipped with position-adjustment thrusters (not shown), a single launch vehicle may be used to deploy all four satellites in a single launch. This significantly reduces the IOC cost.

Once in orbit, the positions of the satellites 12 may be adjusted by east/west station keeping. That is, satellites 12 may be temporarily adjusted to a higher elevation (outward from earth), which slows the movement of the satellite. When the desired position is approaching in the lower orbit, the satellite elevation can be moved inward to the proper position in the desired orbit.

After launch, the first deployment is shifted into place using the thrusters. The first deployment of satellites 12 have orbital voids 39 therebetween.

Figure 3B:
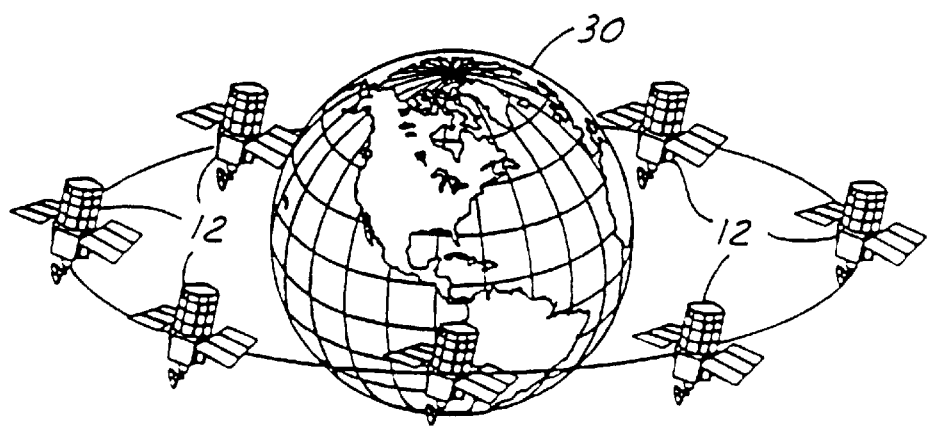
FIG. 3B is a schematic illustration of a constellation of communications satellites after a second deployment.

Referring now to FIG. 3B, a satellite constellation in medium earth orbit is illustrated after a second deployment. In this case, four additional satellites were deployed simultaneously in the second deployment. The second deployment is shifted into the orbital voids 39 after they are placed into orbit. This second deployment, as will be described further below, increases the elevation angle at the most populated elevations. Satellites 12 may be positioned by east/west station keeping as described above so that the second deployment is interleaved between the first deployment.

Figure 3C:
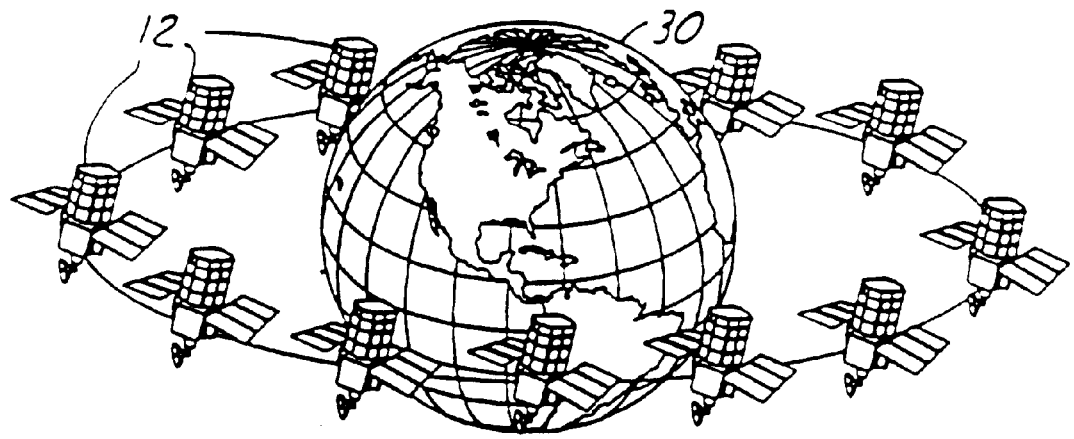
FIG. 3C is a schematic illustration of a constellation of communications satellites after a third deployment.

Referring now to FIG. 3C, if further satellites are deemed to be required from the second deployment, a third deployment may be employed. In this case, four satellites are launched simultaneously to obtain the third deployment. Prior to the third deployment, however, satellites 12 may be shifted in their orbiting positions so that the single third deployment may deploy each of the last four satellites 12.

Figure 3D:
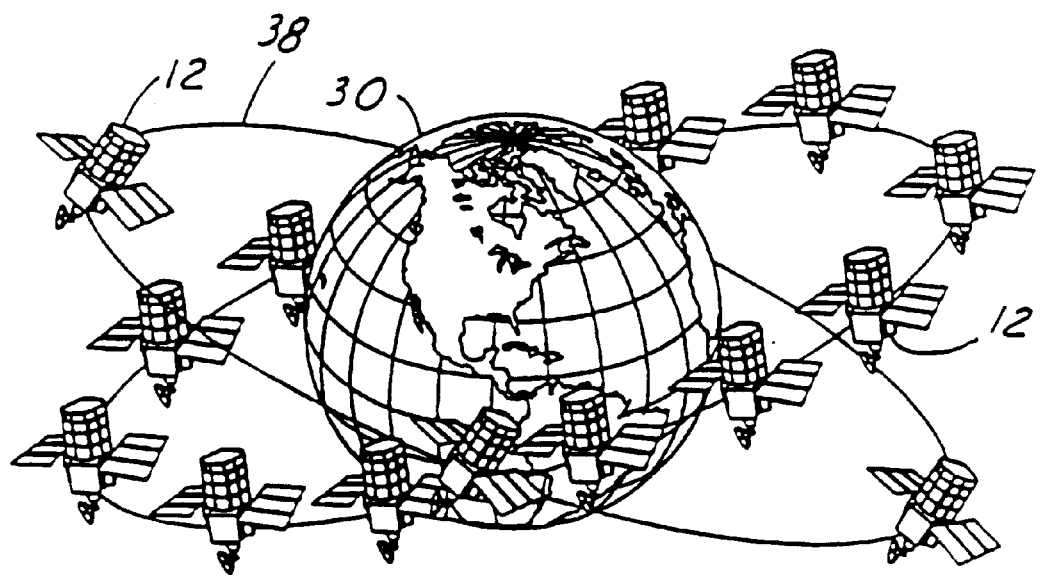
FIG. 3D is a schematic illustration of a constellation of communications satellites after a fourth deployment into an inclined orbit.

Referring now to FIG. 3D, if demand on the satellite constellation is increased further, more medium earth orbit satellites may be deployed on the equatorial plane. However, if spacing between the MEO satellites becomes too small, then satellites 12 may be deployed in an inclined orbit 38. The inclined orbit illustrated is also preferably filled with medium MEO satellites. The satellites 12 in the inclined medium earth orbit are also preferably launched by the single launch vehicle and are adjustable within their orbit paths. This will allow more groups of satellites to be positioned in a single launch in the inclined orbit 38.

If the business demands on the system are such that further satellites are required, additional planes inclined at various angles with respect to the equatorial plane may also be deployed. Also, various numbers of satellites may be deployed within those inclined orbits.

Figure 4:
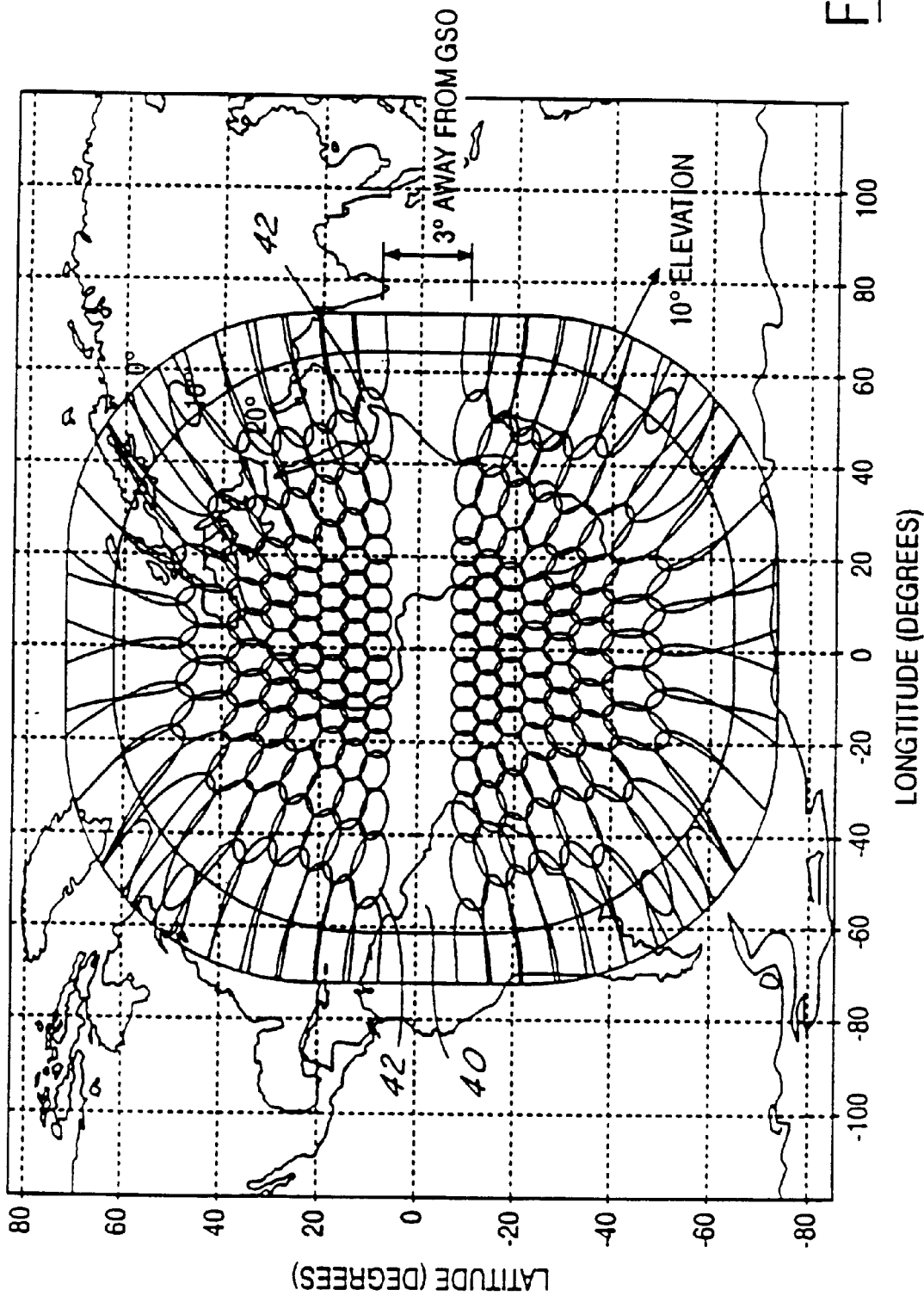
FIG. 4 is a schematic illustration of satellite coverage using spot beams.

Referring now to FIG. 4, a preferred spot beam design is illustrated with respect to the Western Hemisphere. In this illustration, a GSO satellite sharing belt 40 is illustrated in the equatorial region. The GSO satellite sharing belt 40 is plus or minus 11 degrees of latitude. That is, the total belt north to south is 1224 km. To achieve the desired coverage, 253 beam positions are covered by the satellite 50 beams maximum will be illuminated. The beams are referred to generally by the reference numeral 42. Preferably, each satellite covers 90 degrees longitude. Thus, four satellites would provide coverage for most regions of the earth in the first phase. The beams generated are preferably 2.5 degrees in width.

Figure 5:
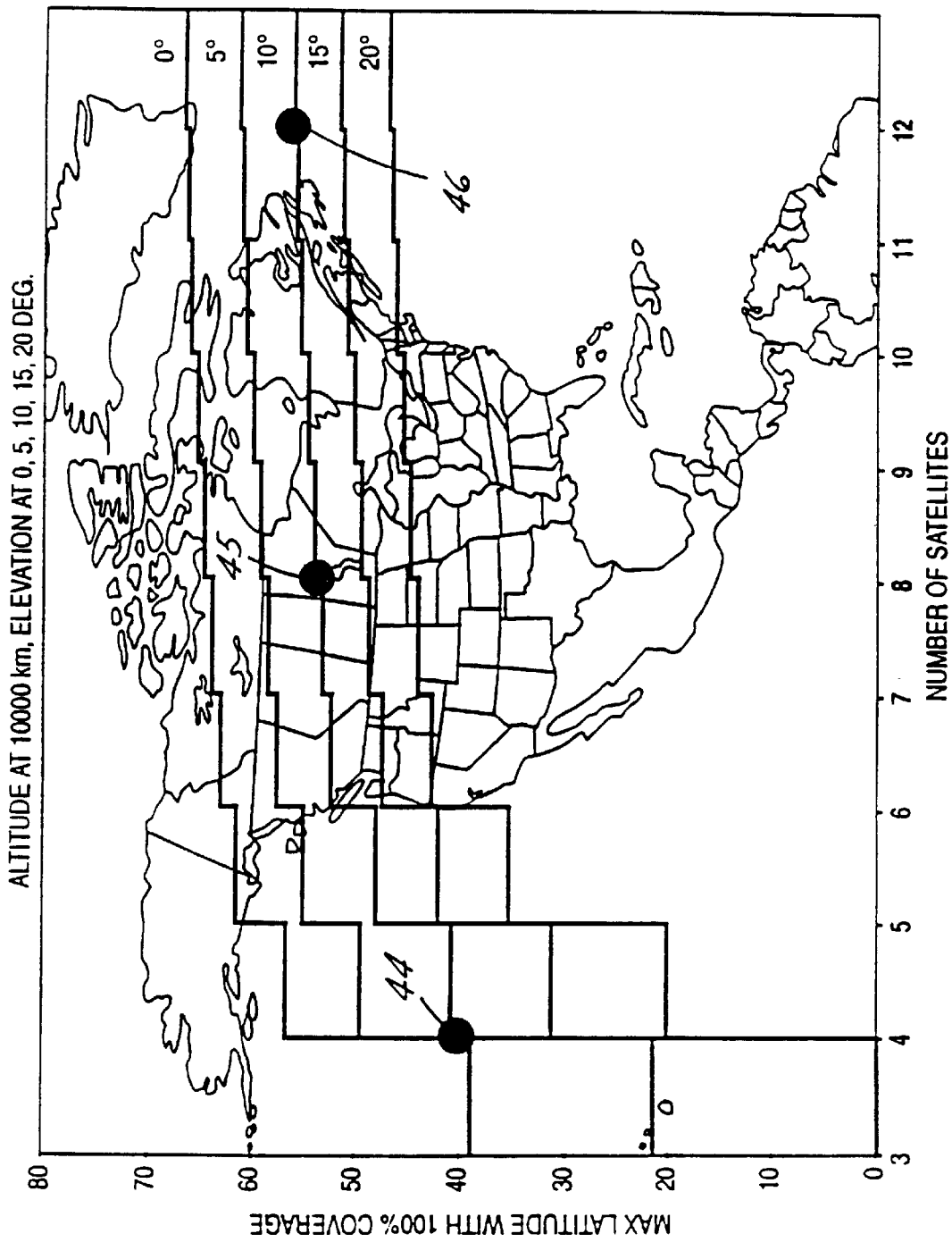
FIG. 5 is a plot of latitude with 100% coverage versus number of satellites in the constellation at an elevation of 10000 km.

Referring now to FIG. 5, a plot of latitudes with 100 percent coverage versus the number of satellites in a constellation at an elevation of 10000 km is illustrated with respect to various elevation angles. As is shown at point 44, at about 39 degrees latitude, 100 percent of the area is covered by at least an elevation angle of 0 degrees. At about 55 degrees latitude, 100 percent coverage is attained if the elevation angle requirement is ten degrees using eight satellites as illustrated at point 45. Coverage of 100 percent is achieved at a 10 degree elevation angle at about 57° latitude with greater than twelve satellites in the equatorial plane as illustrated at point 46.

Figure 6:
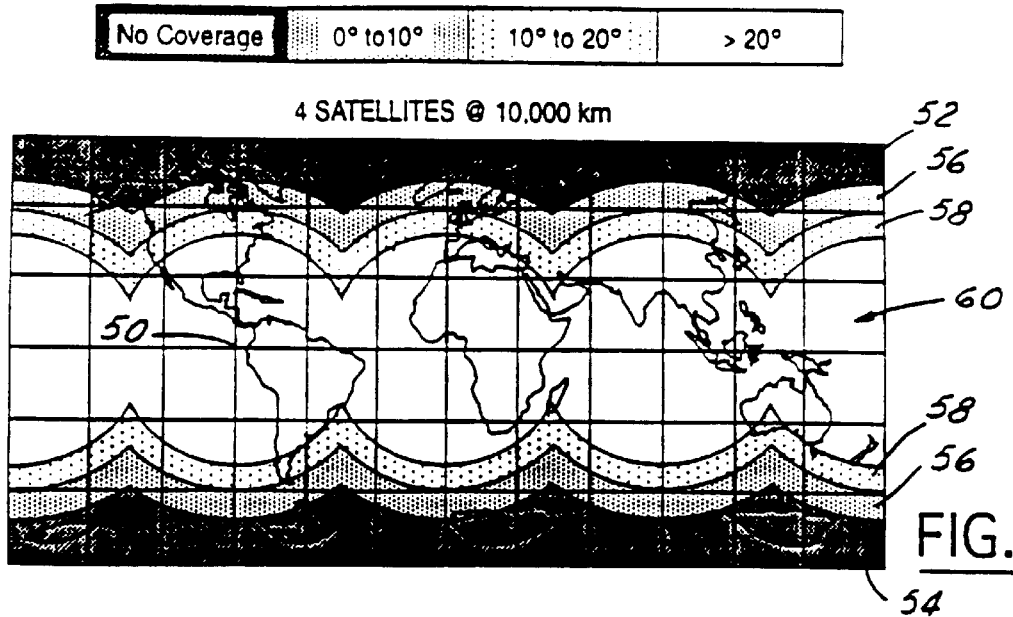
FIG. 6 is a global plot illustrating coverage and elevation angle in a constellation using 4 satellites.

Referring now to FIG. 6, a map of the world is illustrated with various elevation angles of coverage. The coverage for four satellites 50 at an altitude of 10000 km on the equatorial plane is illustrated. The uppermost 52 and lowermost 54 regions of the map have no coverage. The next band lower 56 in latitudes has zero to ten degrees elevation angle coverage. The next band 58 in latitude has 10 to 20 degrees coverage in latitude, and the center portion 60 of the map has over the 20 degrees elevation angle.

Figure 7:
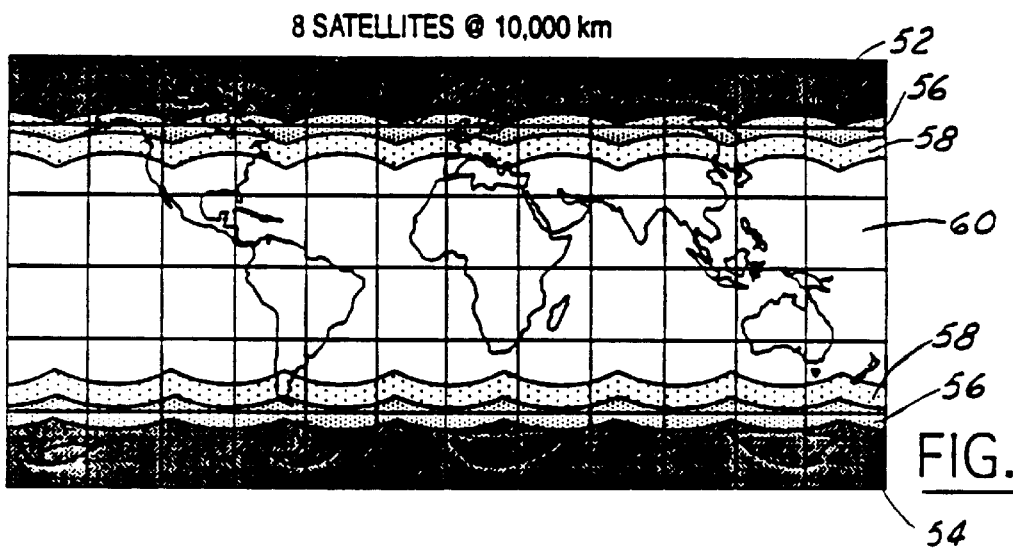
FIG. 7 is a global plot illustrating coverage and elevation angle in a constellation using 8 satellites.

Referring now to FIG. 7, a similar map to that of FIG. 6 is illustrated. In this illustration, eight satellites 70 deployed at 10000 km in altitude on the equatorial plane are shown. The same reference numerals as in FIG. 6 are used to identify the various regions of coverage.

Figure 8:
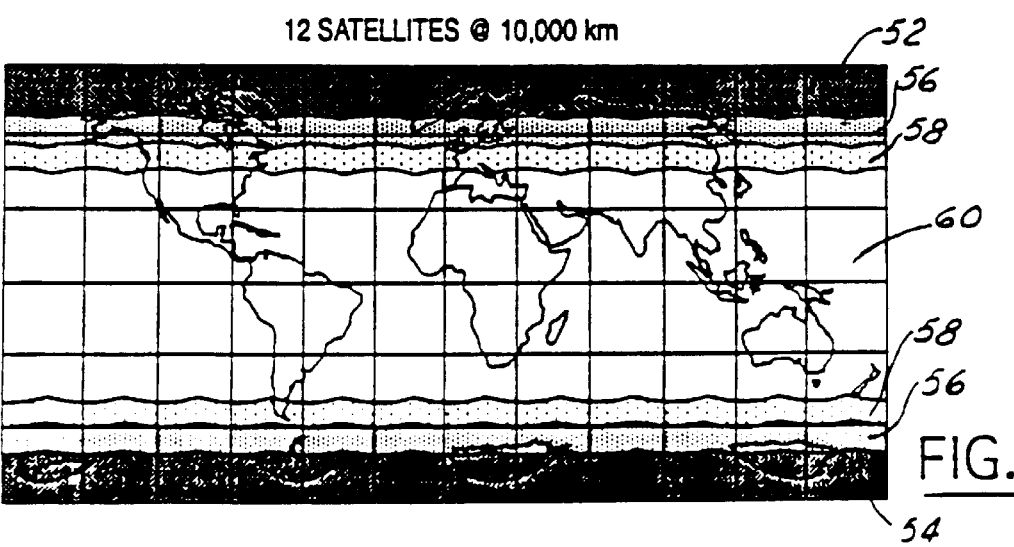
FIG. 8 is a global plot illustrating coverage and elevation angle in a constellation using 12 satellites.

Referring now to FIG. 8, the coverage for 12 satellites 80 at an altitude of 10000 km on the equatorial plane is shown. As can be seen, most land regions of the earth are covered in areas having between 0 and 10 degrees of elevation angle. The same reference numerals as in FIG. 6 are used to identify the various regions of coverage.

Figure 9:
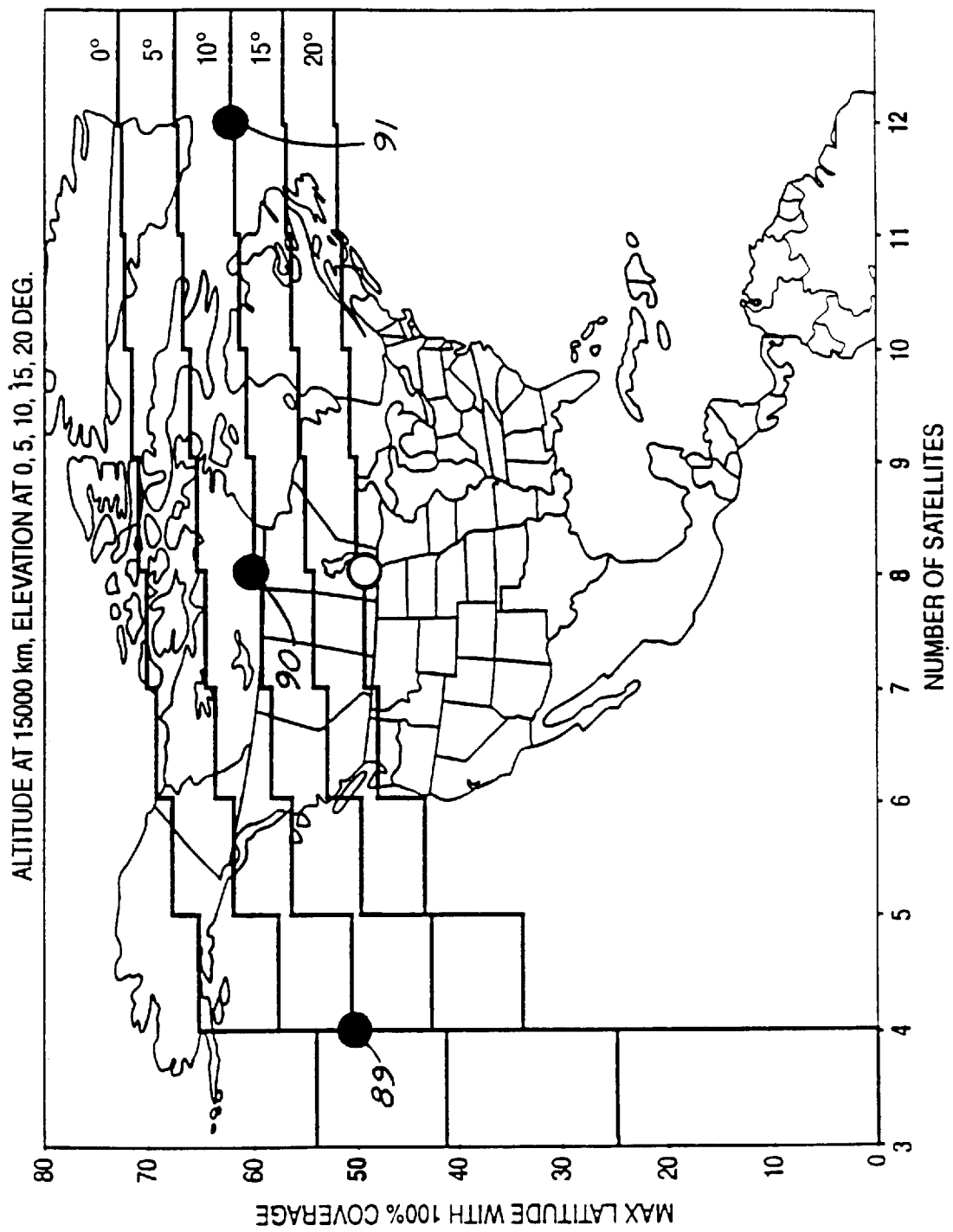
FIG. 9 is a plot of latitude with 100% coverage versus the number of satellites in the constellation at an altitude of 15000 km.

Referring now to FIG. 9, a graph similar to that of FIG. 5 is shown with satellites having a 15000 km altitude. The advantage of using a 15000 km altitude rather than a 10000 km is evident. At point 89, similar elevation angles as that shown in FIG. 5 are present at 50 degrees latitude. For example, at latitudes near 60 degrees, elevation angles up to ten degrees may be achieved using eight satellites as illustrated at point 90. At point 91, about 63° latitude, 100 percent coverage may be achieved with twelve satellites. Increasing the satellite distance to 15000 km increases all of the elevation angles.

In operation, a first plurality of satellites is launched into a medium earth orbit in a first configuration. When traffic on the satellites approaches capacity for communications, the second plurality of satellites is deployed in medium earth orbit. The second plurality of satellites is preferably launched in a single launch. The first set of satellites and the second plurality of satellites are then interleaved in the same orbital path. Preferably, the satellites are in orbit 15000 km above the earth. This allows higher elevation angles to higher latitudes of the earth.

If further satellites are required because of increasing communications on the satellite, further deployment to satellites may be launched in a similar manner. When the spacing approaches capacity for the medium earth orbit orbit, inclined medium earth orbits may be employed. Several planes of medium earth orbit satellites may be used to substantially increase the capacity of the system. Preferably, each of the deployments preferably is deployed in groups from a single launch.

Satellite technology is rapidly changing. The second deployment is launched some time after the first deployment. This allows the second deployment: and subsequent deployments the opportunity to use more current technology. Also, because groups of satellites are deployed together, the launch schedule is more flexible than launching individual satellites into their exact positions.

Figure 10:
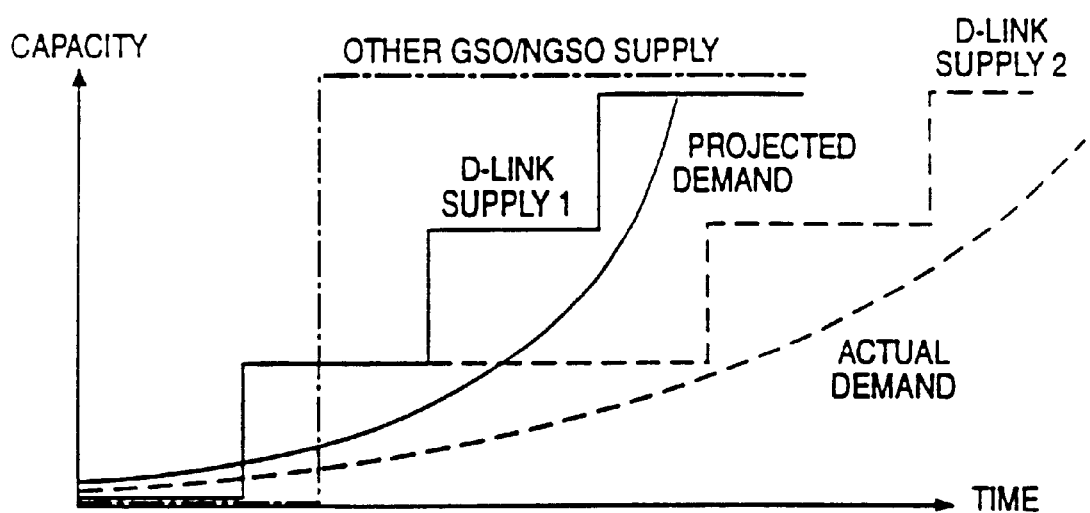
FIG. 10 is a graph of the capacity versus time plot illustrating the advantages of the present invention.

Referring now to FIG. 10, several advantages of the system as described with respect to the present invention are illustrated. As can be seen, actual demand may not align with projected demand for the system. In this manner, if actual demand is lower, a second or subsequent launch may be delayed until demand increases. Likewise, if demand increases more rapidly than expected, the launch schedule can be moved forward. The advantage of the lower cost of the initial system makes the system more practical than other systems where a full system is initially deployed at a high cost.

While particular embodiments of the invention have been shown and described, numerous variations and alternate embodiments will occur to those skilled in the art.

Accordingly, it is intended that the invention be limited only in terms of the appended claims.

What is claimed is:

1. A communications system comprising:
    a first deployment of a plurality of satellites deployed in a medium earth orbit on an equatorial plane;
    a second deployment of a plurality of satellites deployed in the medium earth orbit on the equatorial plane interleaved with said first deployment; and
    a ground terminal for communicating with said first and second deployment.

2. A communications system as recited in claim 1 wherein an antenna in said ground terminal is scanned in a single dimension.

3. A communications system as recited in claim 1 wherein an antenna in said ground terminal is scanned in two dimensions.

4. A communications system as recited in claim 1 wherein said medium earth orbit is substantially about 15000 km above the earth.

5. A communications system as recited in claim 1 wherein said satellites reuse the same frequencies as geostationary satellites.

6. A communications system as recited in claim 1 further comprising a third deployment of satellites deployed on an orbit inclined with respect to the equatorial plane.

* * * * *

UNITED STATES PATENT AND TRADEMARK OFFICE
CERTIFICATE OF CORRECTION

PATENT NO.    : 6,336,612 B1
DATED         : January 8, 2002
INVENTOR(S)   : Frank Taormina et al.

It is certified that error appears in the above-identified patent and that said Letters Patent is hereby corrected as shown below:

<u>Column 4,</u>
Lines 50-52, the sentence that reads "The path of satellites 12 is in the line of GSO satellites 36, except for at a narrow region around equator 32" should read -- The path of satellites 12 is not in the line of sight of GSO satellites 36, except for a narrow region around equator 32. --

Signed and Sealed this

Fourteenth Day of October, 2003

JAMES E. ROGAN
*Director of the United States Patent and Trademark Office*